United States Patent [19]
Furuhata et al.

[11] Patent Number: 4,642,708
[45] Date of Patent: Feb. 10, 1987

[54] MAGNETIC RECORDING AND REPRODUCING APPARATUS

[75] Inventors: Takashi Furuhata, Yokohama; Katsuo Mohri, Yokosuka; Katsuo Konishi, Yokohamashi, all of Japan

[73] Assignee: Hitachi, Ltd., Tokyo, Japan

[21] Appl. No.: 759,963

[22] Filed: Jul. 29, 1985

[30] Foreign Application Priority Data

Jul. 27, 1984 [JP] Japan ................................. 59-155298

[51] Int. Cl.⁴ .............................................. G11B 5/56
[52] U.S. Cl. ...................................................... 360/77
[58] Field of Search .......................................... 360/77

[56] References Cited

U.S. PATENT DOCUMENTS 4,229,773 10/1980 Sakamoto ............................... 360/77
4,306,261 12/1981 Bergmans et al. ...................... 360/77

Primary Examiner—George G. Stellar
Attorney, Agent, or Firm—Antonelli, Terry & Wands

[57] ABSTRACT

The rotary head type helical scanning magnetic tape recording and reproducing apparatus is provided with an auxiliary recording head for recording pilot signals adjacent to a main head for recording a signal to be recorded, and an auxiliary reproducing head for reproducing the recorded pilot signals.

The pilot signals recorded to an antecedent track are reproduced by the auxiliary reproducing head at the time of recording to the next track. A tracking control of the main head at the time of next track recording is effected according to the reproduced pilot signals.

8 Claims, 9 Drawing Figures

MAGNETIC RECORDING AND REPRODUCING APPARATUS

BACKGROUND OF THE INVENTION

The present invention relates to a rotary head magnetic recording and reproducing apparatus and particularly relates to tracking control for such apparatus.

In a conventional rotary head magnetic recording and reproducing apparatus such as helical scanning VTR or the like, there is known a method (disclosed in Japanese Patent Laid-Open No. 116120/1978 and Japanese Patent Publication No. 20622/1981) for tracking control for scanning a track recorded and so formed on a magnetic tape correctly with a rotary head, wherein a pilot signal is recorded together with a signal to be recorded such as a video signal through frequency multiplex, crosstalk of the pilot signal reproduced from both adjacent tracks at the time of playback is detected, and the tracking control is carried out so as to make the amplitude levels of crosstalk components from both adjacent tracks equal to each other.

The conventional method is effective for tracking control during playback, however, it is not effective for tracking control during recording.

As an example of realizing tracking control during recording, a known method (Japanese Patent Laid-Open No. 115113/1979) is such that a pilot signal is recorded intermittently along the longitudinal axis of a track, and a recording is carried out through tracking control by equalizing the magnitude of crosstalk pilot signals which are detected alternately at the intermittent portions on every tracks.

In the conventional rotary head magnetic recording and reproducing apparatus, an unavoidable problem is that a track bends particularly at the time of recording or tracks overlap each other due to a relative displacement in scanning of a tape and a head, and what is essential accordingly is that tracking control will be realized with precision to the track bend in both recording and reproducing so as to secure an interchangeability of apparatuses or enhance the recording density from narrowing a track width. However, the conventional method mentioned above is that of detecting a tracking error alternately and intermittently at the time of recording, and is not to disclose an extensive and precisely continuous tracking control for decreasing an influence to be exerted by the track bend or the overlap of tracks with each other, thus leaving the problem unsettled.

SUMMARY OF THE INVENTION

An object of the present invention is to provide a magnetic recording and reproducing apparatus ready for detecting a continuous tracking error information not only at the time of reproducing but also at the time of recording, thereby effecting high precision tracking control.

The above-mentioned object will be attained by the invention which provides a magnetic recording and reproducing apparatus comprising: a main head mounted on a disc rotatable at a predetermined speed, for recording a signal to be recorded on a magnetic tape; an auxiliary recording head mounted on the disc at a position near the main head, for recording a pilot signal on the magnetic tape so as to form a recording track having a predetermined relative position with a recording track of the main head; an auxiliary reproducing head mounted on the disc at a position near the main head, for reproducing a pilot signal recorded in the preceding track, when the main head records a signal in the next track; means for controlling a relative position of the main head with the magnetic tape at the time of recording in the next track in response to the pilot signal reproduced on the auxiliary reproducing head.

DETAILED DESCRIPTION OF PREFERRED EMBODIMENTS

Figure 1:
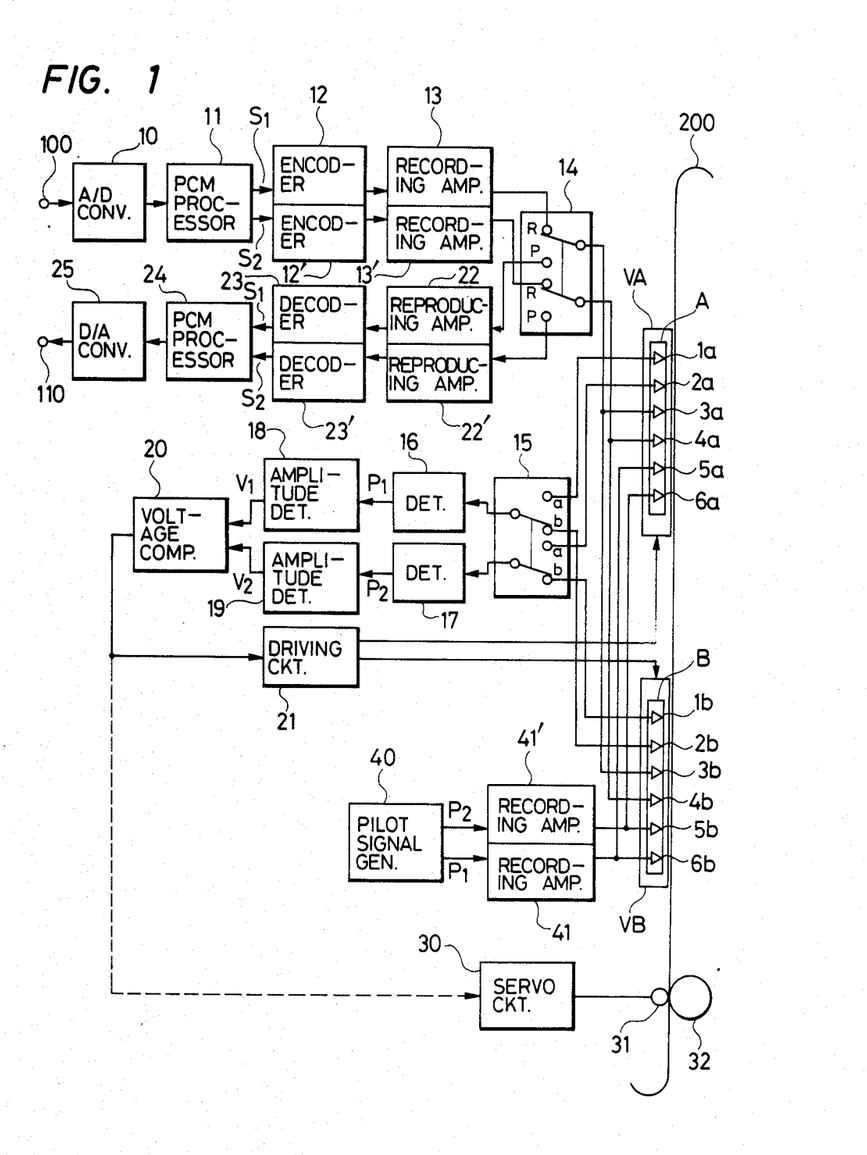
FIG. 1 is a block diagram representing one embodiment of a magnetic recording and reproducing apparatus according to the present invention.
Figure 2:
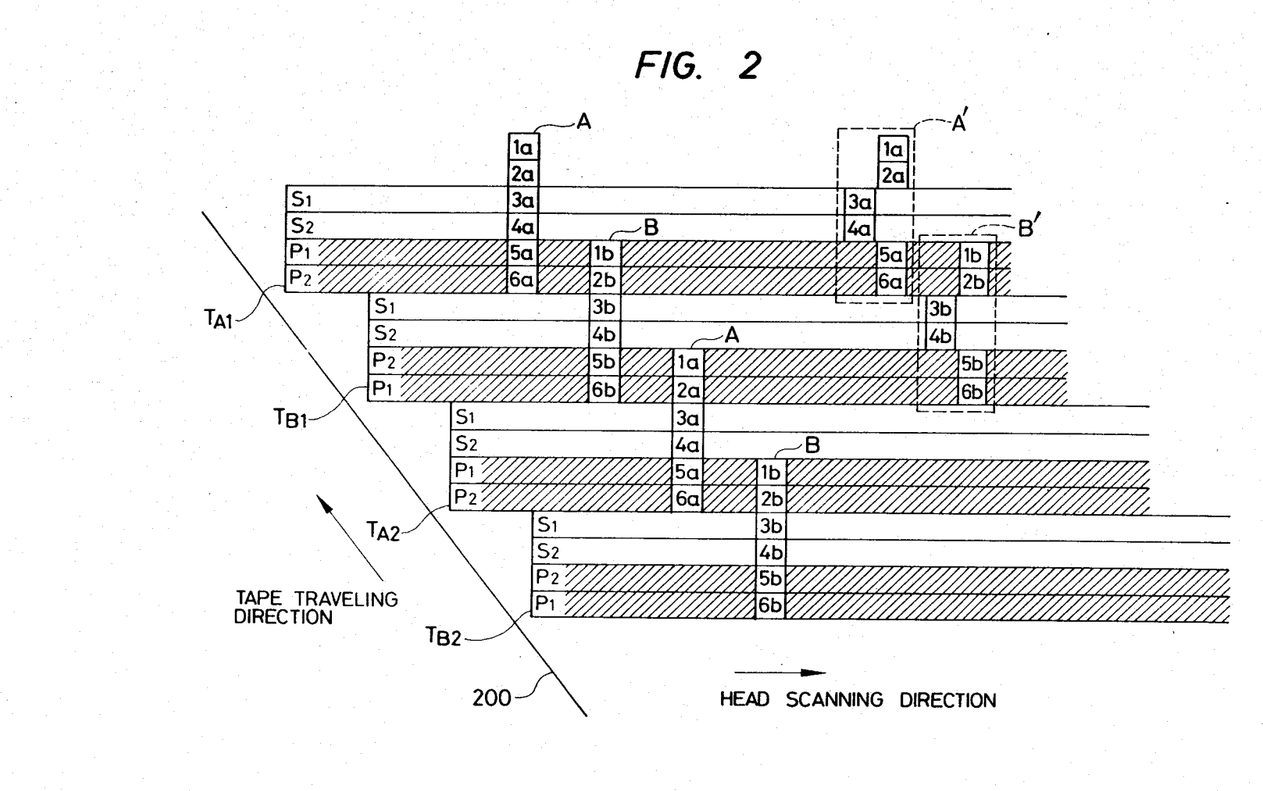
FIG. 2 and FIG. 3 show patterns of the tracks recorded thereby.
Figure 3:
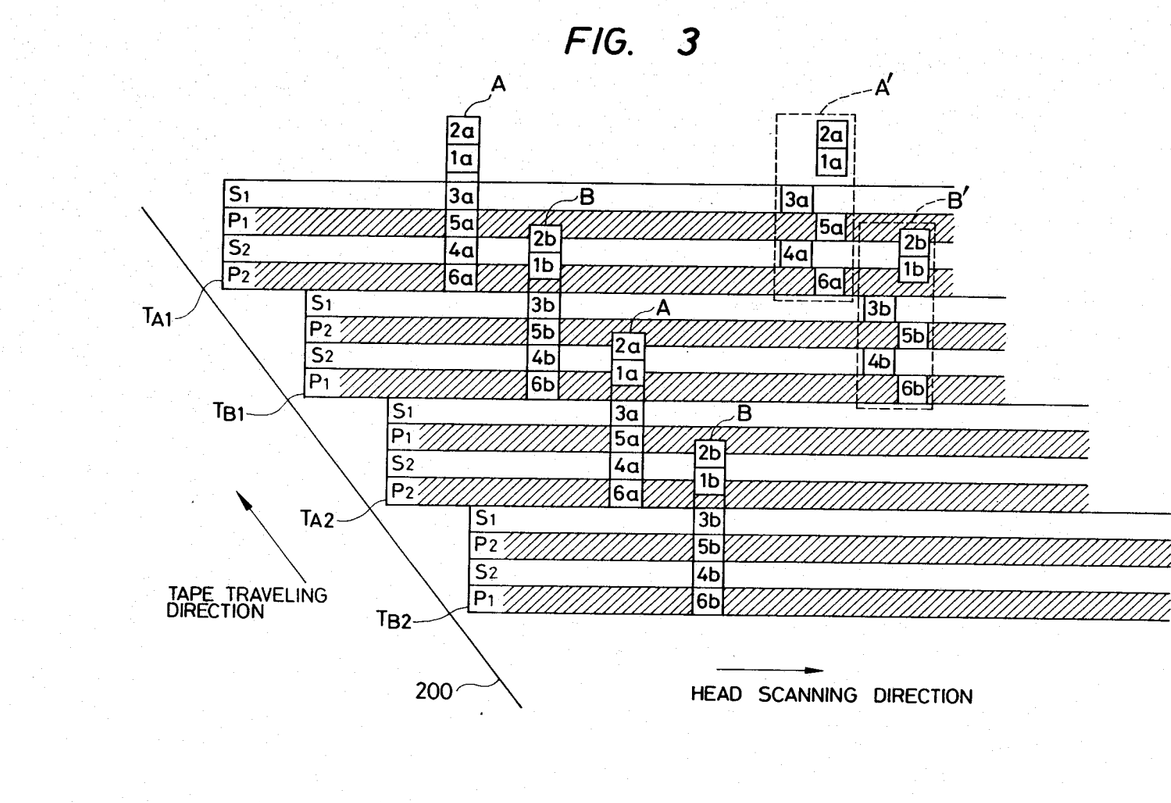

The invention will now be described in detail with reference to its preferred embodiments. FIG. 1 is a block diagram representing one embodiment wherein the invention is applied to a rotary head helical scanning digital recording VTR, and FIG. 2 and FIG. 3 are drawings showing a pattern of the track recorded and so formed thereby.

In FIG. 1, symbols A and B denote composite heads constituted respectively of main heads $3a$, $4a$ and $3b$, $4b$ for recording or reproducing main signals $S_1$, $S_2$ described hereinafter, auxiliary heads $5a$, $6a$ and $5b$, $6b$ for recording pilot signals $P_1$, $P_2$ to be described later, and auxiliary heads $1a$, $2b$ and $1b$, $2b$ for reproducing the pilot signals recorded by said auxiliary heads. As shown in the composite heads A and B of FIG. 2, the auxiliary heads ($1a$, $2a$, $5a$, $6a$), ($1b$, $2b$, $5b$, $6b$) are arrayed near the main heads ($3a$, $4a$), ($3b$, $4b$).

The two composite heads A and B are mounted on one end surface of piezoelectric elements VA and VB movable on voltage applied thereto, which are known well hitherto, and other end surfaces of the piezoelectric elements are fixed (not indicated so) on a head disc and also mounted so as to hold the two composite heads A and B at 180° apart from each other. The head disc is rotated by a disc motor controlled at a constant speed by a disc servo-circuit (not indicated).

A reference numeral 200 denotes a magnetic tape, which is wound on the head disc at angles over 180° and actuated to run by a capstan motor 31 held to a constant speed by a capstan servo-circuit 30 and a pinch roller 32.

As shown in FIG. 2, consequently, the composite heads A and B contact the magnetic tape 200 alternately so that a track $T_A$ ($T_{A1}$, $T_{A2}$, ...) is formed on the magnetic tape 200 by the composite head A and a track $T_B$ ($T_{B1}$, $T_{B2}$, ...) is alternately formed thereon by the composite head B.

A reference numeral 100 denotes an input terminal for signals to be recorded, and a video signal, for example, is input in the embodiment. The video signal input through the terminal 100 is converted into a digital signal through an analog-to-digital converter 10. An output signal from the analog-to-digital converter 10 is converted into a series of PCM signals by a PCM (pulse code modulation) processor 11 with redundant codes such as a code for correcting error, a code for detecting error, synchronizing code for location and the like added properly thereto, and in the embodiment, it is divided into two-channel PCM signals $S_1$ and $S_2$ and so output for decreasing a transmission rate to $\frac{1}{2}$.

The two-channel PCM signals $S_1$ and $S_2$ output from PCM processor 11 are properly encoded at every channels by encoders 12, 12' according to a channel coding method such as NRZ, NRZI, MFM, FM or the like which is known hitherto. Output signals from the encoders 12, 12' are amplified at every channel by recording amplifiers 13, 13' and then fed to the composite heads A and B through an R side terminal of a switching circuit 14.

The signals $S_1$ and $S_2$ thus divided into two channels are fed to the composite heads A and B as main signals, the one main signal $S_1$ is recorded in tracks indicated by $S_1$ of the tracks $T_A$, $T_B$ of FIG. 2 by the main heads 3a and 3b, and the other main signal $S_2$ is recorded in tracks indicated by $S_2$ of the tracks $T_A$, $T_B$ of FIG. 2 by the main heads 4a and 4b.

A reference numeral 40 denotes a pilot signal generator, generating two pilot signals $P_1$ and $P_2$ on different frequencies. The pilot signals $P_1$ and $P_2$ from the pilot signal generator 40 are fed to the composite heads A and B through recording amplifiers 41, 41', the one pilot signal $P_1$ is recorded on tracks indicated by $P_1$ of the tracks $T_A$, $T_B$ of FIG. 2 by the auxiliary heads 5a and 6b, and the other pilot signal $P_2$ is recorded on tracks indicated by $P_2$ of the tracks $T_A$, $T_B$ of FIG. 2 by the auxiliary heads 6a and 5b.

Here, the main heads (3a, 4a), (3b, 4b) and the auxiliary heads (5a, 6a), (5b, 6b) in the composite heads A and B can be arrayed arbitrarily, since an effect of the present invention wherein tracking error information is continuously detected with a good S/N and high precision tracking control is carried out particularly at the time of recording, will be obtainable from properly determining an array of the auxiliary heads (1a, 2a), (1b, 2b) for reproducing pilot signals in accordance with the array of the heads for recording.

That is, when the main heads (3a, 4a), (3b, 4b) and the auxiliary heads (5a, 6a), (5b, 6b) are arrayed in that order to a tape traveling direction and a head scanning direction shown in FIG. 2, the pilot signal reproducing auxiliary heads (1a, 2a), (1b, 2b) are arrayed on an upper side of the main heads (3a, 4a), (3b, 4b). Accordingly, the array in this case will be, for example, 1a, 2a, 3a, 4a, 5a, 6a in that order as shown in FIG. 2. Then, the array of composite heads is not limited only to the case where they are arrayed in one row vertically as shown in A, B of FIG. 2, but the auxiliary heads 1a, 2a and 5a, 6a can be arrayed to shift from the main heads 3a, 4a, and the auxiliary heads 1b, 2b and 5b, 6b are arrayed to shift from the main heads 3b, 4b as shown in A' and B' of the composite heads of FIG. 2, which may answer the purpose of this invention.

According to the array above, the auxiliary heads 1a, 1b and 2a, 2b will scan tracks of those tracks $T_A$ and $T_B$ recorded and so formed by the composite heads A and B, in which the pilot signals $P_1$ and $P_2$ are recorded by the auxiliary heads (5a, 6a), (5b, 6b).

More specifically, the track $T_{A1}$ is recorded and formed by the composite head A and the track $T_{B1}$ is then recorded and formed by a scanning of the next composite head B, however, in this case, the auxiliary heads 1b and 2b of the composite head B will scan the tracks (indicated by the symbols $P_1$ and $P_2$ designating the pilot signals $P_1$ and $P_2$ recorded on the track $T_{A1}$ in FIG. 2) in which the pilot signals $P_1$ and $P_2$ are recorded by the auxiliary heads 5a and 6a of the composite head A in a normal tracking state.

A reference numeral 15 denotes a switching circuit, which is controlled and transferred synchronously with rotations of the composite heads A, B alternately to a terminal a when the composite head A scans on the magnetic tape 200 and to a terminal b when the composite head B scans on the magnetic tape 200. Reference numerals 16 and 17 denote pilot signal detection circuits, which detect the pilot signals $P_1$ and $P_2$ respectively in a signal fed from the switching circuit 15, and the outputs are fed to amplitude detection circuits 18 and 19 each.

The switching circuit 15 is connected to the terminal b side while the composite head B scans the magnetic tape 200, a reproducing signal from the auxiliary head 1b is fed to the pilot signal detection circuit 17; consequently, the pilot signal $P_2$ is detected thereby, and a reproducing signal from the auxiliary head 2b is then fed to the pilot signal detection circuit 16, and the pilot signal $P_1$ is detected.

That is, in a normal tracking state, the pilot signal $P_2$ is detected as crosstalk from the adjacent track ($P_2$) by the one auxiliary head 1b, and the pilot signal $P_1$ is detected likewise as a crosstalk from the adjacent track ($P_1$) by the other auxiliary head 2b. A crosstalk component of each pilot signal corresponds to a tracking error in its amplitude level, and in FIG. 2, for example, where a scanning center of the composite head B is dislocated to an upper side of the drawing the crosstalk component of the pilot signal $P_2$ from the auxiliary head 1b decreases, the crosstalk component of the pilot signal $P_1$ from the auxiliary head 2b increases, but where the scanning center of the composite head B is dislocated to a lower side of the drawing to the contrary, the relation totally reverse to what is described above will hold. Accordingly, an error rate and a polarity of displacement of the tracking can be detected by comparing amplitude levels of the crosstalk components of each pilot signal.

The crosstalk components of each pilot signal from the circuits 16, 17 which are based on the tracking error are detected for amplitude on the amplitude detection circuits 18 and 19 respectively, and error voltages $V_1$ and $V_2$ according to the amplitude levels are output. The error voltages $V_1$ and $V_2$ from the circuits 18 and 19 are compared on a voltage comparator 20, so that a tracking error signal according to a differential voltage ($V_1 - V_2$) between both the two is output from the circuit 20 while the composite head B scans, and a tracking error signal with a polarity reverse thereto which corresponds to a differential voltage ($V_2 - V_1$) is output therefrom while the composite head A scans.

The tracking error signal from the circuit 20 is fed to a piezoelectric element VB on which the composite head B is mounted through a piezoelectric element driving circuit 21 while the composite head B scans but to a piezoelectric element VA on which the composite head A is mounted while the composite head A scans. The piezoelectric elements VA, VB are moved perpendicular to the direction in which the head scans according to the tracking error signal from the circuit 20.

Thus, while the composite head B scans, tracking is controlled so as to equalize the crosstalk of the pilot signal $P_2$ from the adjacent track $(P_2)$ reproduced by the auxiliary head $1b$ to the crosstalk of the pilot signal $P_1$ from the adjacent track $(P_1)$ reproduced by the auxiliary head $2b$, accordingly the next track $T_{B1}$ is recorded and so formed by the composite head B following precisely the track $T_{A1}$ recorded and formed by the composite head A.

Consecutively to the track $T_{B1}$ thus formed, the next track $T_{A2}$ is recorded and formed by scanning the next composite head A, however, since the switching ciruit 15 is transferred to the terminal a in this case, the signal reproduced by the auxiliary head $1a$ of the composite head A is fed to the circuit 16 and the signal reproduced by the auxiliary head $2a$ is fed to the circuit 17; hence, tracking is controlled likewise so as to equalize the crosstalk of the pilot signal $P_1$ from the adjacent track $(P_1)$ reproduced by the auxiliary head $1a$ to the corsstalk of the pilot signal $P_2$ from the adjacent track $(P_2)$ reproduced by the auxiliary head $2a$. Accordingly, the track $T_{A2}$ is recorded and formed following precisely the track $T_{B1}$ in this case, too.

The above description refers to a case where tracking control is effected according to the movement of the piezoelectric elements, however, as indicated by a broken line route of FIG. 1, tracking control may be realized by controlling tape running speed from negative feedback of the tracking error signal from the circuit 20 to the capstan motor 31 through the capstan servo-circuit 30, or both the systems can be employed at the same time, which may satisfy the purpose of this invention.

Tracking control at the time of recording has been taken up for description as above, however, it can be secured exactly in the same way as above at the time of reproducing, too, therefore a further description will be omitted. At the time of reproducing, the switching circuit 14 is connected to a terminal P side, the main signals $S_1$ and $S_2$ which are reproduced by using alternately the main heads $3a$, $4a$ and the main heads $3b$, $4b$ are amplified by reproducing amplifiers 22, 22' at every channels, decoded to the source PCM signals by decoders 23, 23' at every channel, and after processing such as code correction is applied on PCM processor 24, a series of digital signals are restored, and the video signal which is a source analog signal is restored by a digital-to-analog converter 25 on its digital output and then output to a terminal 110. Then during reproducing, it is evident that a recording of the pilot signals by the auxiliary heads $5a$, $6a$ and $5b$, $6b$ is stopped. Further, it will easily be understood that the auxiliary heads $5a$, $6a$, $5b$, $6b$ are used instead of the auxiliary heads $1a$, $2a$ and $1b$, $2b$, the tracking control can be effected likewise according to crosstalk components of the pilot signals $P_2$ and $P_1$ reproduced by the auxiliary heads $5a$ and $6a$ respectively at reproducing the track $T_A$ and also according to crosstalk components of the pilot signals $P_1$ and $P_2$ reproduced by the auxiliary heads $5b$ and $6b$ at reproducing the track $T_B$.

Next, a description will be given of the embodiment wherein an array of the main head and the auxiliary head in the composite heads A and B is different from that of FIG. 1 with reference to a pattern drawing of FIG. 3.

The main heads $3a$, $3b$, $4a$, $4b$ and the auxiliary heads $5a$, $5b$, $6a$, $6b$ of the composite heads A and B are arrayed alternately as shown in FIG. 3, and the pilot signal reproducing auxiliary heads $2a$, $2b$, $1a$, $1b$ are arrayed on an upper side of the main heads. Accordingly, the array in this case will be, for example, $2a$, $1a$, $3a$, $5a$, $4a$, $6a$ in that order as shown in FIG. 3. In this case, the array of the composite heads is not necessarily limited to the case where they are arrayed in one row vertically as indicated by A,B of FIG. 3, but the auxiliary heads $2a$, $1a$ and $5a$, $6a$ can be arrayed to shift, for example, to the main heads $3a$, $4a$ as indicated by A', B' of FIG. 3, both satisfying the purpose of this invention.

In FIG. 3, the main signals $S_1$, $S_2$ are recorded by the main heads $3a$, $3b$, $4a$, $4b$, the pilot signal $P_1$ is recorded by the auxiliary heads $5a$, $6b$, and the pilot signal $P_2$ is recorded by the auxiliary heads $6a$, $5b$, the same as in the case of FIG. 2 described hereinabove. According to the above-mentioned array, the auxiliary heads $2b$ and $1a$ scan $\frac{1}{2}$ width of the track $(P_1)$ in which the pilot signal $P_1$ is recorded out of the tracks $T_A$ and $T_B$ recorded and formed by the composite heads A and B under normal tracking state, and the auxiliary heads $1b$ and $2a$ scan $\frac{1}{2}$ width of the track $(P_2)$ in which the pilot signal $P_2$ is recorded.

Concretely furthermore, after the track $T_{A1}$ is recorded and formed by the composite head A, the track $T_{B1}$ is recorded and formed by scanning of the next composite head B. Under normal tracking state, the auxiliary head $2b$ scans $\frac{1}{2}$ width of the track $(P_1)$ in which the pilot signal $P_1$ is recorded, the pilot signal $P_1$ is detected by the circuit 16, and the auxiliary head $1b$ scans $\frac{1}{2}$ width of the track $(P_2)$ in which the pilot signal $P_2$ is recorded, thus the pilot signal $P_2$ is detected by the circuit 17. A detection level of the pilot signals $P_1$, $P_2$ corresponds to the tracking error, and while a crosstalk component of the pilot signal from the adjacent track is detected in the case of FIG. 2, the pilot signal from a scanning track is detected in FIG. 3, therefore a tracking error signal can be detected more favorably in S/N. Thus tracking control is performed so that levels of the pilot signals $P_1$ and $P_2$ detected by the auxiliary heads $2b$ and $1b$ respectively will be equalized with each other, the next track $T_{B1}$ is recorded and formed by the composite head B following precisely the track $T_{A1}$ recorded and formed by the composite head A, and then the tracks $T_{A2}$, $T_{B2}$... are formed successively likewise.

Figure 4:
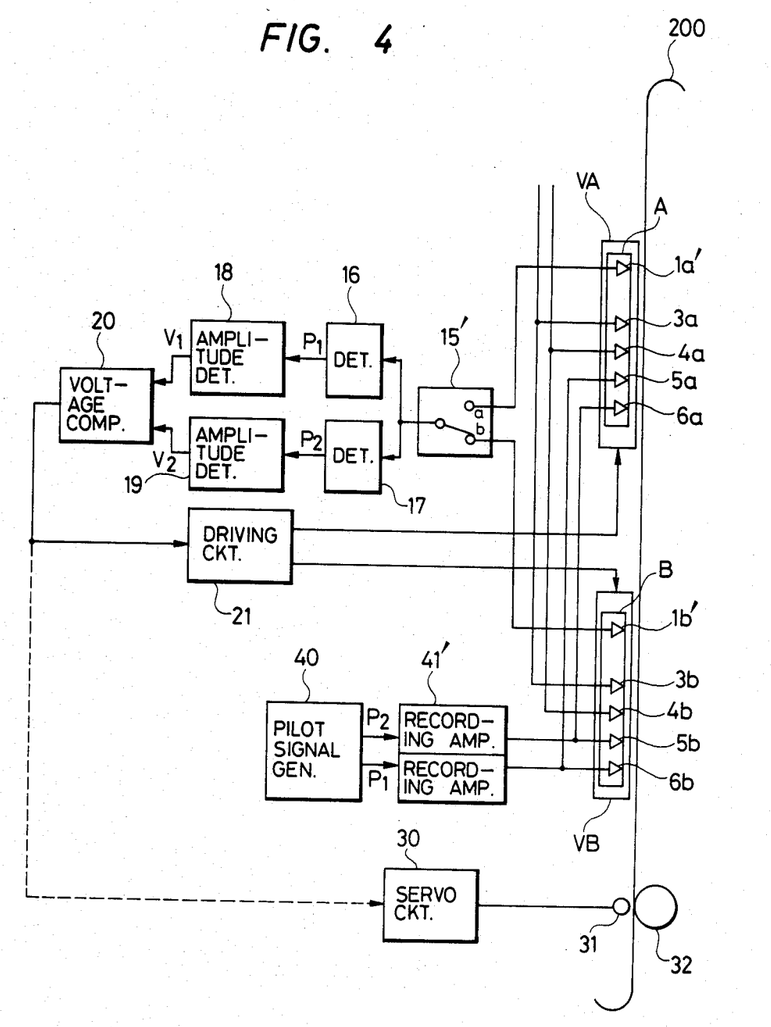
FIG. 4 is a block diagram representing another embodiment of the present invention.
Figure 5:
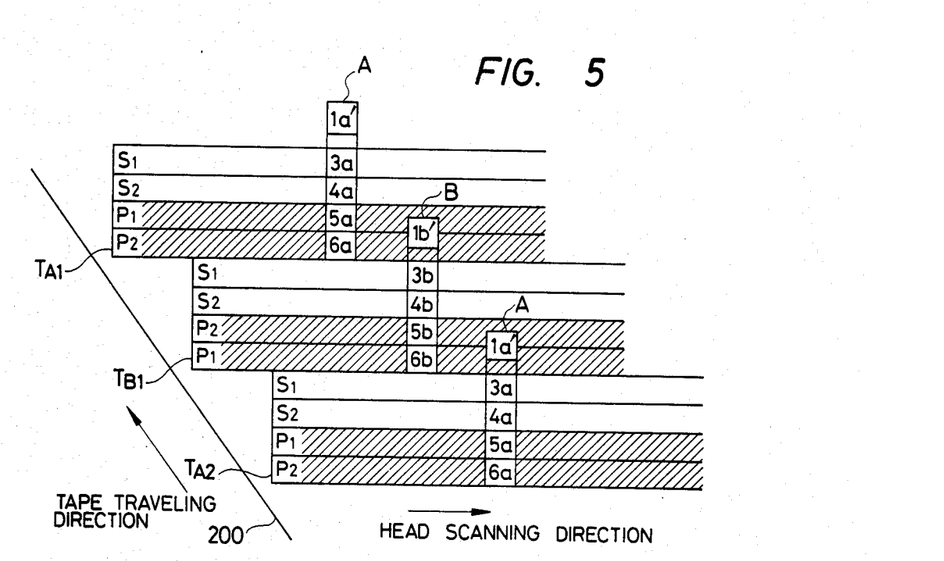
FIG. 5 and FIG. 6 show patterns of the tracks recorded thereby.
Figure 6:
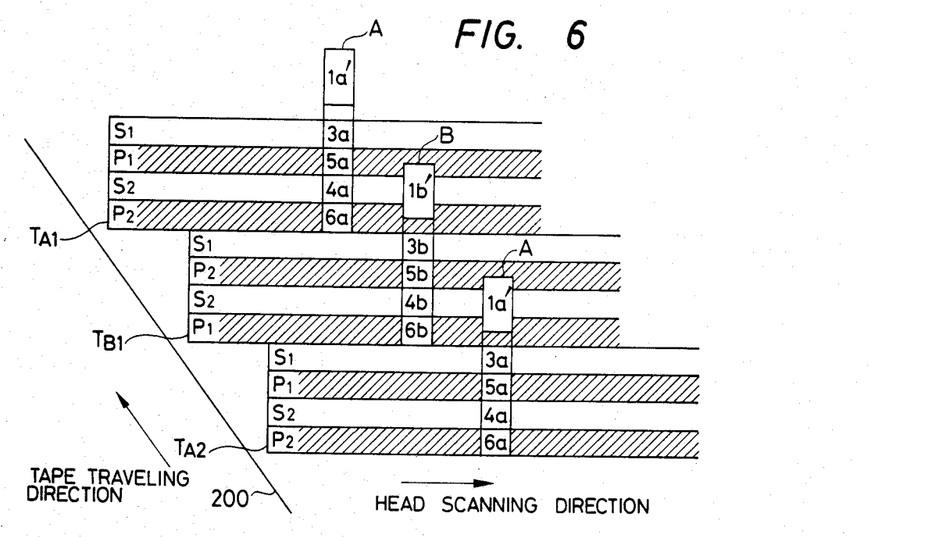

The description given above refers to the case where the pilot signal reproducing head is used two each, however, using one each may result in a high precision tracking control likewise in the invention. One preferred embodiment of such case will be shown in FIG. 4. FIG. 5 and FIG. 6 are pattern drawings of the embodiment. In FIG. 4, a recording and reproducing system of the main signal is exactly the same as FIG. 1, therefore a further description will be omitted here, and only a tracking control system which is a purpose of this invention will be illustrated. Then, the major part of the tracking control system and the composite head can be substituted by those of FIG. 1 in construction, therefore common parts are identified by the same reference character.

In the composite heads A and B of FIG. 4, the situation remains the same as in the case of FIG. 1, except that $1a'$ and $1b'$ are used as pilot signal reproducing heads, and the main signal is recorded by the main heads $3a$, $4a$, $3b$, $4b$, and the pilot signal is recorded by the auxiliary heads $5a$, $6a$, $5b$, $6b$. As an arraying method for the composite heads, a pattern drawing of a track recorded and formed in the magnetic tape 200 when the composite head is arrayed in the order of $1a'$, $3a$, $4a$, $5a$, $6a$ is shown in FIG. 5, and a pattern drawing when the composite head is arrayed in the order of $1a'$, $3a$, $5a$, $4a$, $6a$ is shown in FIG. 6. The patterns of FIG. 5 and FIG.

6 coincide with those of FIG. 2 and FIG. 3 respectively. In the embodiment of FIG. 4, the array of composite heads is not necessarily limited to one row vertically, and the invention can be applied to the case where the main heads 3a, 4a, 3b, 4b and the auxiliary heads 5a, 6a, 5b, 6b are arrayed to shift from each other, which is also to satisfy the purpose of this invention.

According to the arrays described above, as will be apparent from FIG. 5 or FIG. 6, in the normal tracking state the auxiliary head 1b' or 1a' will scan concurrently two tracks in which the pilot signals $P_1$ and $P_2$ are recorded, and the two pilot signals $P_1$ and $P_2$ are thus reproduced concurrently. A signal reproduced by the auxiliary head 1b' or 1a' is fed through a switching circuit 15' to both the circuit 16 for detecting the pilot signal $P_1$ and the circuit 17 for detecting the pilot signal $P_2$, therefore the pilot signals $P_1$ and $P_2$ are detected concurrently from each of the circuits 16 and 17. A detection level of the pilot signals $P_1$ and $P_2$ corresponds to the tracking error, and the same as in the case of FIG. 3, the pilot signal not from the adjacent track but from the scanning track is detected, therefore a tracking error signal can be detected at a good S/N. A tracking control is effected so that levels of the two pilot signals $P_1$ and $P_2$ detected thus concurrently by the auxiliary head 1b' or 1a' will be equalized, and the next track is recorded and formed successively following precisely the track recorded and formed.

Figure 7:
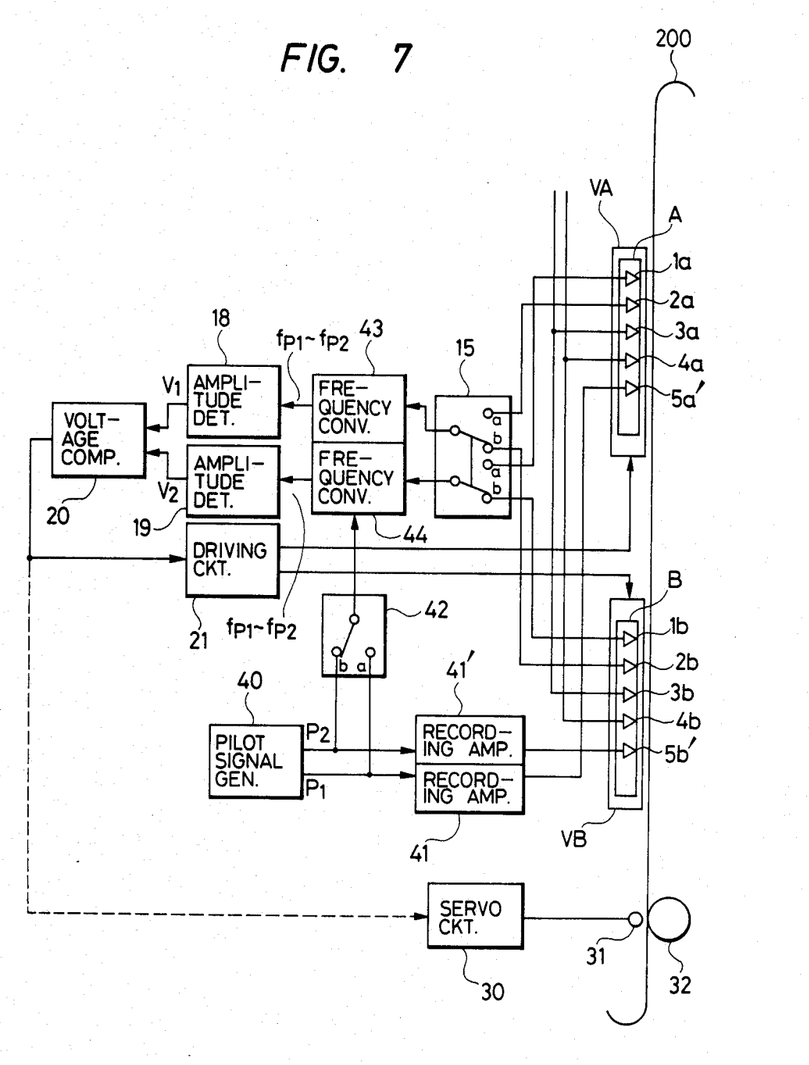
FIG. 7 is a block diagram representing a further embodiment according to the present invention.
Figure 8:
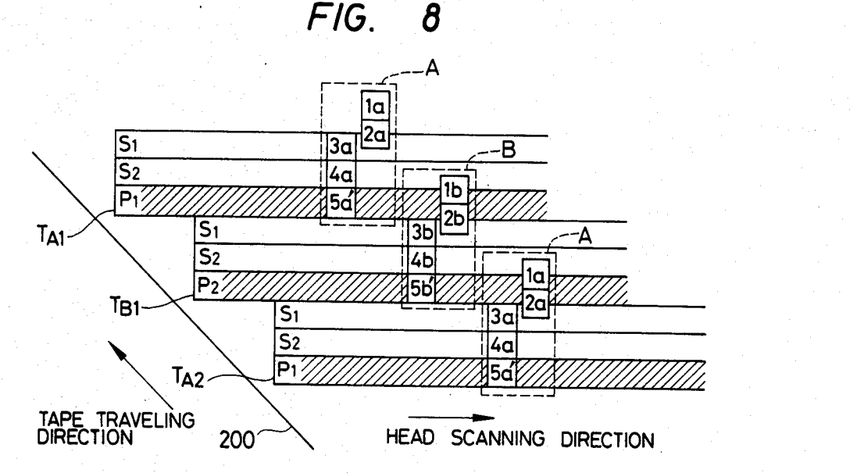
FIG. 8 and FIG. 9 show patterns of the tracks recorded thereby.
Figure 9:
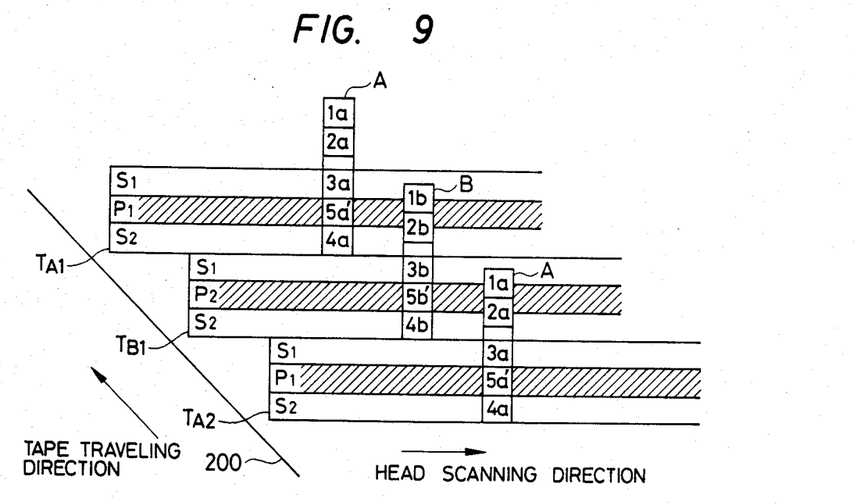

The embodiments of FIG. 1 and FIG. 4 refer to the case where the pilot signal recording auxiliary heads 5a, 6a, 5b, 6b are used in two each, however, using one each may result in a similar tracking control in this invention. One embodiment of such case is shown in FIG. 7. FIG. 8 and FIG. 9 are pattern drawings of the embodiment. In FIG. 7 a recording and reproducing system of the main signal is the same as that of FIG. 1, therefore a further description will be omitted, and only the tracking control system which is a purpose of the invention will be illustrated. Common parts with FIG. 1 and FIG. 4 are identified by the same reference character.

In the composite heads A and B of FIG. 7, the situation remains same as in the case of FIG. 1 except that the pilot signal $P_1$ is recorded by an auxiliary head 5a' and the pilot signal $P_2$ is recorded by an auxiliary head 5b', the main signal is recorded by the main heads 3a, 4a, 3b, 4b, and the auxiliary heads 1a, 2a, 1b, 2b are used for reproducing the pilot signal. A pattern drawing of the track recorded and formed in the magnetic tape 200 in case the composite head is arrayed, for example, in the order of (1a, 2a, 3a, 4a, 5a') is shown in FIG. 8, and a pattern drawing obtainable when the composite head is arrayed in the order of (1a, 2a, 3a, 5a', 4a) is shown in FIG. 9.

Then, in FIG. 7, a reference numeral 42 denotes a switching circuit, which is transferred to terminal a to feed the pilot signal $P_1$ from the circuit 40 to frequency converters 43 and 44 while the composite head A scans, and also transferred to terminal b to feed the pilot signal $P_2$ from the circuit 40 to the frequency converters 43 and 44 while the composite head B scans. In the frequency converters 43 and 44, the pilot signal fed from the switching circuit 15 and reproduced by the auxiliary heads 1a and 2a or 1b and 2b is subjected to a frequency conversion according to the pilot signal fed from the switching circuit 42, differential frequency components of both the two are detected each, the outputs are fed to the amplitude detection circuits 18 and 19, and outputs $V_1$ and $V_2$ according to amplitudes of the differential frequency components are put out of the circuits 18 and 19.

According to the above-mentioned array of the composite heads, as will be apparent from FIG. 8 or FIG. 9, the two auxiliary heads 1a and 2a or 1b and 2b can the track in which the pilot signal $P_1$ or $P_2$ is recorded under normal tracking state. That is, after the track $T_{A1}$ is recorded and formed by the composite head A, the track $T_{B1}$ is recorded and formed by scanning of the next composite head B continuing thereto, however, the auxiliary heads 1b and 2b scan the track in which the pilot signal $P_1$ is recorded in this case.

Accordingly, the pilot signal $P_1$ reproduced by the auxiliary head 1b is fed to the circuit 44 through the switching circuit 15, and the pilot signal $P_1$ reproduced by the auxiliary head 2b is fed to the circuit 43. Since the switching circuit 42 is connected to the terminal b, the pilot signal $P_2$ from the circuit 40 is fed to the frequency converters 43 and 44. Consequently, the reproduced pilot signal $P_1$ is subjected to frequency conversion by the pilot signal $P_2$ in the circuits 43 and 44, and differential frequency components $(f_{P1} \sim f_{P2})$ of both are detected. The differential frequency components correspond to a tracking error, and when, for example, the scanning center of the composite head B is displaced to the upper side in FIG. 8 or FIG. 9, the differential frequency components $(f_{P1} \sim f_{P2})$ from the circuit 44 according to the reproduced pilot signal $P_1$ from the auxiliary head 1b decrease, and the differential frequency components $(f_{P1} \sim f_{P2})$ from the circuit 43 according to the reproduced pilot signal $P_1$ from the auxiliary head 2b increase. Thus, a tracking control is effected so that the differential frequency components detected in the circuits 43 and 44 are equalized with each other, and the track $T_{B1}$ is recorded and formed following precisely the track $T_{A1}$. Further, the next track $T_{A2}$ continuing thereto is subjected to a tracking control correspondingly to the differential frequency components $(f_{P1} \sim f_{P2})$ according to the pilot signal $P_2$ reproduced by the auxiliary heads 1a and 2a and the pilot signal $P_1$ from the circuit 40, and is recorded and formed successively.

Then, the above embodiment refers to the case where the main signal to record is divided into two channels for recording, however, it can be divided into more than two or it can be recorded in one channel only without division. Further, the main signal to record is not necessarily limited to a digital signal, and an analog signal can be recorded as hitherto. Then, the track for recording the pilot signal therein may be used exclusively for tracking control, however, the pilot signal and the main signal are subjected to a frequency multiplexing to record according to the frequency multiplexing system prevailing hitherto, both the two are subjected to a frequency separation at the time of reproducing, and thus the pilot signal is detected to the tracking control likewise, the latter method being effective particularly in enhancing recording density.

As described above, according to the invention, since high precision tracking control is secured through detecting continuously tracking error information while the head scans not only when reproducing but also particularly when recording, the effect of track bend due to relative displacement of the tape and the head for running and scanning can be sharply reduced, further mutual interference of the tracks caused thereby can be decreased, an interchangeability between apparatuses will be compensated consequently to enhance a reliability of the apparatus, and a track width can be narrowed further to enhance recording density.

What is claimed is:

1. A magnetic recording and reproducing apparatus provided with a disc rotatable at a predetermined speed and a magnetic head mounted on the disc, for recording a signal on a magnetic tape, and the signal being recorded on the magnetic tape so as to form a plurality of recording tracks inclined at a predetermined angle to a traveling direction of the magnetic tape and parallel with each other, which comprises:

a main head mounted on said disc, for recording a signal to be recorded on the magnetic tape;

an auxiliary recording head mounted on said disc at a position near the main head, for recording a pilot signal on the magnetic tape so as to form a recording track having a predetermined relative position with a recording track of the main head;

an auxiliary reproducing head mounted on said disc at a position near the main head, for reproducing the pilot signal recorded in a preceding track, at the time of the main head recording a signal in the next track; and means for controlling the relative position of the main head with the magnetic tape at the time of recording in said next track in response to the pilot signal reproduced by the auxiliary reproducing head.

2. The magnetic recording and reproducing apparatus according to claim 1, wherein said pilot signal comprises two signal components, said means includes means for comparing amplitudes of the two components reproduced by said auxiliary reproducing head and controls a position of said main head according to a result of the comparison.

3. A magnetic recording and reproducing apparatus provided with a disc rotatable at a predetermined rotational speed and at least two magnetic heads for recording signals on a magnetic tape, said heads being mounted on the disc each at a position nearly 180° apart on the circumference of the disc, said heads recording signals alternately on the magnetic tape so as to form alternately recording tracks inclined at a predetermined angle to a traveling direction of the magnetic tape and parallel with each other, which comprises:

two head groups, each of which is constituted of:

at least one main head for recording a signal to be recorded, a first and a second auxiliary heads disposed near the main head, for recording a first and a second pilot signals on the magnetic tape so as to form recording tracks having a predetermined relative position with respect to a recording track of the main head, a first and a second auxiliary reproducing heads disposed near the main head, for reproducing the first and second pilot signals recorded on a preceding track, when recording on the next track, and which are mounted on said disc each at a position nearly 180° apart on the circumference of said disc; and means for controlling the relative position of the main head to the magnetic tape at the time of recording to said next track in response to the first and second pilot signals reproduced by the first and second auxiliary reproducing heads.

4. The magnetic recording and reproducing apparatus according to claim 3, wherein said means are provided with means for comparing amplitudes of said reproduced first and second pilot signals, and a position of said main head is controlled according to a result of the comparison.

5. A magnetic recording and reproducing apparatus provided with a disc rotatable at a predetermined rotational speed and at least two magnetic heads for recording signals on a magnetic tape, said heads being mounted on the disc each at a position nearly 180° separated on a circumference of the disc, said heads recording signals alternately on the magnetic tape so as to form alternately recording tracks inclined at a predetermined angle to a traveling direction of the magnetic tape and parallel with each other, which comprises:

two head groups, each of which is constituted of:

at least one main head for recording a signal to record, a first and a second auxiliary heads disposed near the main heads, for recording a first and a second pilot signals on the magnetic tape so as to form recording tracks having a predetermined relative position with a recording track of the main head, one auxiliary reproducing head disposed near the main head, for reproducing the first and second pilot signals recorded on an antecedent track, at the time of recording to the next track, and which are mounted on said disc each at a position nearly 180° separated on a circumference of said disc; and means for controlling the relative position of the main head to the magnetic tape at the time of recording on said next track in response to the first and second pilot signals reproduced by the auxiliary reproducing head.

6. The magnetic recording and reproducing apparatus according to claim 5, wherein said means are provided with means for comparing amplitudes of said reproduced first and second pilot signals, and a position of said main head is controlled according to a result of the comparison.

7. A magnetic recording and reproducing apparatus provided with a disc rotatable at a predetermined rotational speed and at least two magnetic heads for recording signals on a magnetic tape, said heads being mounted on the disc each at a position nearly 180° apart on the circumference of the disc, said heads recording signals alternately on the magnetic tape so as to form alternately recording tracks inclined at a predetermined angle to a traveling direction of the magnetic tape and parallel with each other, which comprises:

two head groups, each of which is constituted of:

at least one main head for recording a signal to record, one auxiliary recording head disposed near the main head, for recording one of a first and a second pilot signals different in frequency on the magnetic tape so as to form recording tracks having a predetermined relative position with a recording track of the main head, a first and a second auxiliary reproducing head disposed near the main head, for reproducing the signal recorded to an antecedent track, at the time of recording to the next track, and which are mounted on said disc each at a position nearly 180° separated on a circumference of said disc; and means for controlling a relative position of the main head to the magnetic tape at the time of recording to said next track in response to the signal reproduced by the first and second auxiliary reproducing heads.

8. The magnetic recording and reproducing apparatus according to claim 7, said means comprising:
frequency conversion means for converting the pilot signals reproduced by said first and second auxiliary reproducing heads into signals having a frequency corresponding to the difference in frequency between the pilot signals reproduced by said heads and the residual pilot signals; and
comparison means for comparing amplitudes of the signals subjected to frequency conversion; so that a position of said main head is controlled according to a result of the comparison.

* * * * *